US011221010B2

(12) United States Patent
Hemphill

(10) Patent No.: US 11,221,010 B2
(45) Date of Patent: Jan. 11, 2022

(54) APPARATUS FOR A COUNTERBALANCE FOR AN ECCENTRIC MOTOR

(71) Applicant: SCHAEFFLER TECHNOLOGIES AG & CO. KG, Herzogenaurach (DE)

(72) Inventor: Jeffrey Hemphill, Copley, OH (US)

(73) Assignee: Schaeffler Technologies AG & CO. KG, Herzogenaurach (DE)

(*) Notice: Subject to any disclaimer, the term of this patent is extended or adjusted under 35 U.S.C. 154(b) by 270 days.

(21) Appl. No.: 16/508,561

(22) Filed: Jul. 11, 2019

(65) Prior Publication Data

US 2021/0010471 A1  Jan. 14, 2021

(51) Int. Cl.
F04D 13/06 (2006.01)
F04C 14/10 (2006.01)
H02K 5/24 (2006.01)
F04C 2/10 (2006.01)
F04C 14/22 (2006.01)
H02K 7/06 (2006.01)

(52) U.S. Cl.
CPC .............. F04D 13/06 (2013.01); F04C 2/102 (2013.01); F04C 14/10 (2013.01); F04C 14/22 (2013.01); H02K 5/24 (2013.01); H02K 7/063 (2013.01)

(58) Field of Classification Search
CPC .......... F04C 2/08; F04C 2/10; F04C 2240/30; F04C 2240/40; F04C 2270/11; F04C 2270/12; H02K 5/24; H02K 7/063; F04D 13/06
USPC ........................................................ 418/61.3
See application file for complete search history.

(56) References Cited

U.S. PATENT DOCUMENTS

| 1,849,222 | A | | 3/1932 | Canton | |
|---|---|---|---|---|---|
| 2,561,890 | A | | 7/1951 | Stoddard | |
| 2,840,991 | A | * | 7/1958 | Nisbet | F16H 39/26 60/447 |
| 3,806,284 | A | * | 4/1974 | Jacobs | F04C 18/10 417/534 |
| 4,482,828 | A | | 11/1984 | Vergues et al. | |
| 4,728,837 | A | | 3/1988 | Bhadra | |
| 5,030,866 | A | | 7/1991 | Kawai | |
| 2012/0051955 | A1 | | 3/2012 | Hadar | |
| 2014/0056733 | A1 | * | 2/2014 | Ojima | F04B 17/00 417/321 |
| 2017/0009769 | A1 | * | 1/2017 | Pawlik | F04C 2/3566 |

FOREIGN PATENT DOCUMENTS

| EP | 0565746 A1 | 10/1993 |
|---|---|---|
| EP | 1566545 A2 | 8/2005 |
| EP | 1803938 A1 | 7/2007 |

* cited by examiner

Primary Examiner — Patrick Hamo
(74) Attorney, Agent, or Firm — Rutan & Tucker LLP; Hani Z. Sayed

(57) ABSTRACT

A pump, comprising a rotor axially located between a fluid inlet section and a fluid outlet section, wherein the rotor is configured to rotate about a center axis, a stator surrounding the rotor, wherein the stator includes an inner diameter surface and an outer diameter surface, wherein the inner diameter surface includes a groove surrounding the stator and concentric about the center axis, and a ring surrounding the stator, wherein the ring is adjacent to the groove and defines a gap between an outer diameter of the surface and an inner surface of the ring, wherein the ring includes a ring mass and the stator includes a stator mass, and the ring mass is substantially equal to the stator mass.

20 Claims, 3 Drawing Sheets

APPARATUS FOR A COUNTERBALANCE FOR AN ECCENTRIC MOTOR

TECHNICAL FIELD

The present disclosure relates to motors, such as eccentric motors.

BACKGROUND

Automobiles may be required to meet fuel economy targets. To help meet those targets, vehicles may be equipped with automatic transmissions that utilize start-stop systems. Such start-stop systems shut the engine off when, for example, the vehicle is motionless for a certain duration. When the engine is shut off, a hydraulic pump in the automatic transmission may stop turning and the transmission may come out of gear. Electrically driven auxiliary pumps may be used to prevent the transmissions from coming out of gear.

Eccentric motion of a rotor may cause imbalances when the motor is in use in such pumps. Such imbalances may create noise and vibrations. The noise and vibrations may create disturbances during use for a customer.

SUMMARY

According to one embodiment, an auxiliary pump in a transmission comprises a rotor axially between a fluid inlet section and a fluid outlet section, wherein the rotor is configured to rotate about a center axis, a stator surrounding the rotor, and a ring surrounding about the stator, wherein the ring has a ring mass and the stator has a stator mass, and the ring mass is substantially equal to the stator mass.

According to another embodiment, a pump in a transmission includes a rotor axially between a fluid inlet section and a fluid outlet section, wherein the rotor is configured to rotate about a center axis, a stator surrounding the rotor, wherein the stator includes an inner diameter surface and an outer diameter surface, wherein the inner diameter surface includes a groove surrounding the stator and concentric about the center axis, and a ring surrounding about the stator, wherein the ring is located at the groove and defines a gap between an outer diameter of the surface and an inner surface of the ring.

According to one embodiment, a pump in a transmission comprises a rotor axially located between a fluid inlet section and a fluid outlet section, wherein the rotor is configured to rotate about a center axis, a stator surrounding the rotor, wherein the stator includes an inner diameter surface and an outer diameter surface, wherein the inner diameter surface includes a groove surrounding the stator and concentric about the center axis, and a ring surrounding the stator, wherein the ring is adjacent to the groove and defines a gap between an outer diameter of the surface and an inner surface of the ring, wherein the ring includes a ring mass and the stator includes a stator mass, and the ring mass is substantially equal to the stator mass.

DETAILED DESCRIPTION

Figure 1:
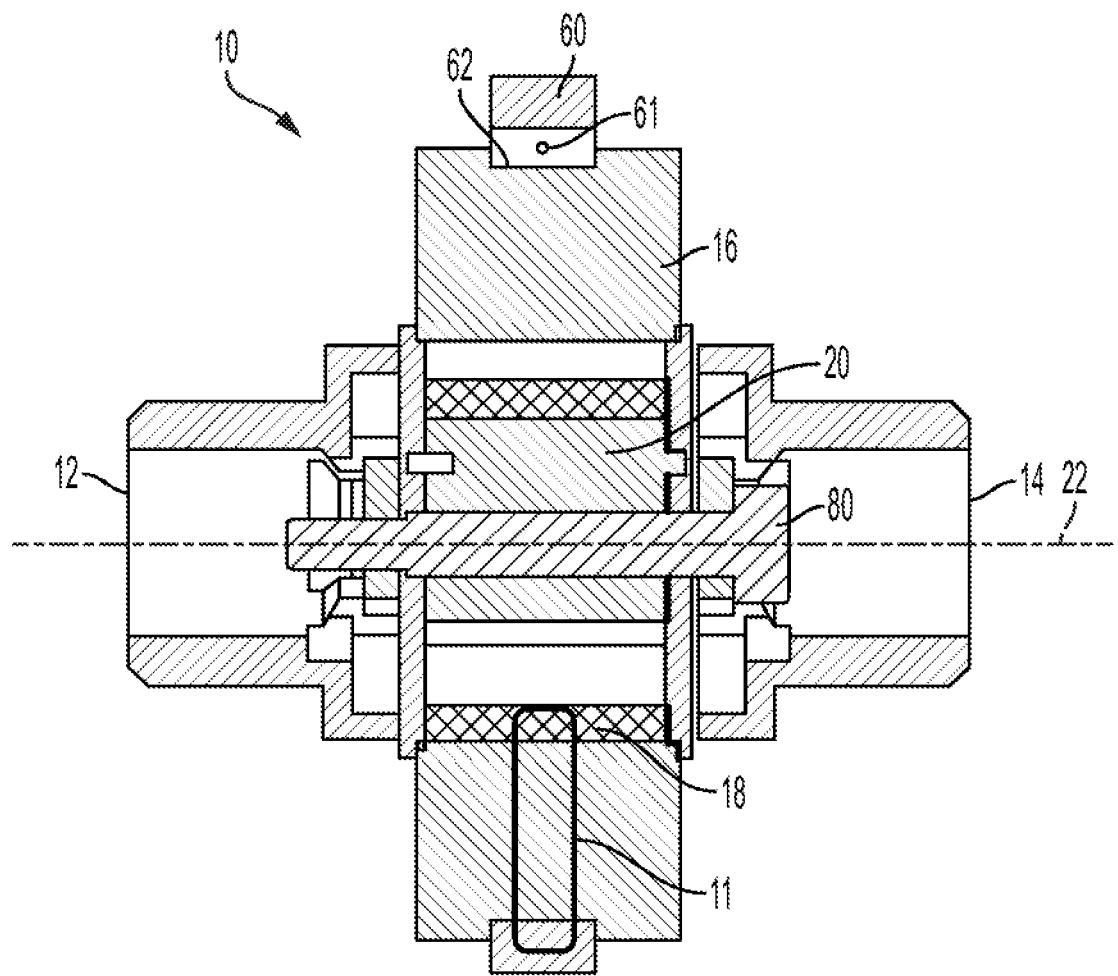
FIG. 1 illustrates a cross-sectional side view of a pump 10.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" may be relative to the central axis. For example, an "outer" surface may describe that the surfaces faces away from the central axis, or is outboard of another "inner" surface. Terms such as "radial," "diameter," "circumference," etc. may also be relative to the central axis. The terms "front," "rear," "upper" and "lower" designate directions in the drawings to which reference is made.

FIG. 1 schematically shows a cross-sectional side view of a pump 10 for an automotive vehicle transmission according to an embodiment of the present disclosure. Pump 10 may be used in other contexts besides an automotive vehicle transmission. Pump 10 includes a fluid inlet section 12 of the housing, a fluid outlet section 14 of the housing, a stator 16 axially between fluid inlet section 12 and fluid outlet section 14, and a rotor 18 axially between fluid inlet section 12 and the fluid outlet section 14. Rotor 18 is shaped as an outer gerotor and configured to rotate eccentrically within stator 16 about a center section 21 (shown in FIG. 2), which is shaped as an inner gerotor. Center section 21 forms a stator of the pump, stator 16 forms a stator of the electric motor and rotor 18 forms a rotor of both the pump and the electric motor. Center section 21 may be non-rotatably fixed with respect to inlet and outlet section 12, 14, meaning that center section 21 may be rotationally fixed so as not to rotate as rotor 18 rotates. A center of center section 21 defines a center axis 22 of pump 10 about which rotor 18 may be designed to rotate around. The terms radially, circumferentially and radially as used herein are used with respect to the center axis, unless otherwise specified.

A ring 60 (e.g. counterbalance ring or balance ring) may be added to orbit around the stator 16. The ring 60 may have the substantially same mass (e.g. +/−2% variance) and substantially same offset as the rotor 18 of the motor, but the ring 60 may be out of phase with the rotor 18. Thus, the ring offset may be the same amount as the rotor 18 and in the opposite direction. This may result in the center of mass of the ring being offset equal and opposite to the center of mass of the rotor. Further, the ring mass times its radial offset may be substantially equal to the rotor's mass times the rotor's offset. Thus, one embodiment may have a heavier ring with a smaller offset, or vice versa. The ring may be circumscribing the rotor 18, stator 16, and center axis 22. The ring 60 may also fully or partially surround the entire outside surface of the stator 16. The polarity of the ring 60 may be opposite of that with the rotor 18. In other embodiments, the ring 60 may have a mass that is substantially less (e.g. 50% less mass) than the rotor mass and cancel a significant portion of the vibration, such as half the vibration.

The outer surface of the stator 16 may include a groove. In another embodiment, the ring 60 may have the same amount of radial play between it and an outer diameter of a groove 62 of the stator 16 as the rotor 18 has an eccentricity relative to the inner diameter of the stator. A groove 62 may be located at the outer diameter surface of the stator 16. While the groove 62 is shown as being rectangular shaped in FIG. 1, the groove 62 may be any shape, such as U-shaped, V-shaped, irregularly shaped, etc. The ring 60 may be the same or different material as that of the rotor 18. The material of the ring 60 may be a material that can conduct magnetic flux, such as a material that is iron-based or contains iron.

The groove 62 and inner surface of the ring 60 may define a gap 61 between the surfaces of ring 60 and stator 16. The groove 62 may keep the ring 60 in place axially. Thus, the groove 62 may have a width the same size width of the ring 60, or the width of the groove 62 may be larger than that of the ring. Furthermore, the groove 62 may provide a flux path for the magnetic flux 11 to flow into the stator 16, then from the stator 16 into the ring 60, and back into the stator 16 from the ring 60 while the ring 60 is rotating. The groove 62 may serve to interrupt the magnetic flux path 11 to attract the ring 60, as the gap 61 defined by the groove 62 creates an airpath. In general, a magnetic flux may attempt to close air gaps. Thus, the magnetic flux 11, may attempt to close the gap 61 between the ring 60 and stator 16.

A magnetic flux 11 or magnetic field 11 may be introduced into the pump from electrification of the rotor 18. When there is no magnetic flux introduced, groove 62 of the stator 16 may define an air gap 61. However, when a magnetic flux 11 is introduced (e.g. the rotor 18 is rotating), the magnetic flux may close the gap 61 between the groove 62 and the ring 60. Thus, a magnetic flux 11 introduced into the motor may move the ring 60 radially closer or further away from the stator 16. As the magnetic field 11 pass around the stator through the energizing of the electrical coils, it attracts the rotor 18 of the pump and the ring 60 to the same point on the stator 16. Thus, the attraction is created as the magnetic flux 11 tries to close the air gap 61 between the rotor 18 and stator 16 and ring 60. As the magnetic field 11 is rotated around the stator 16, the rotor 18 and ring 60 follow each other in this orientation, thus cancelling the imbalance of the rotor 18.

Figure 2:
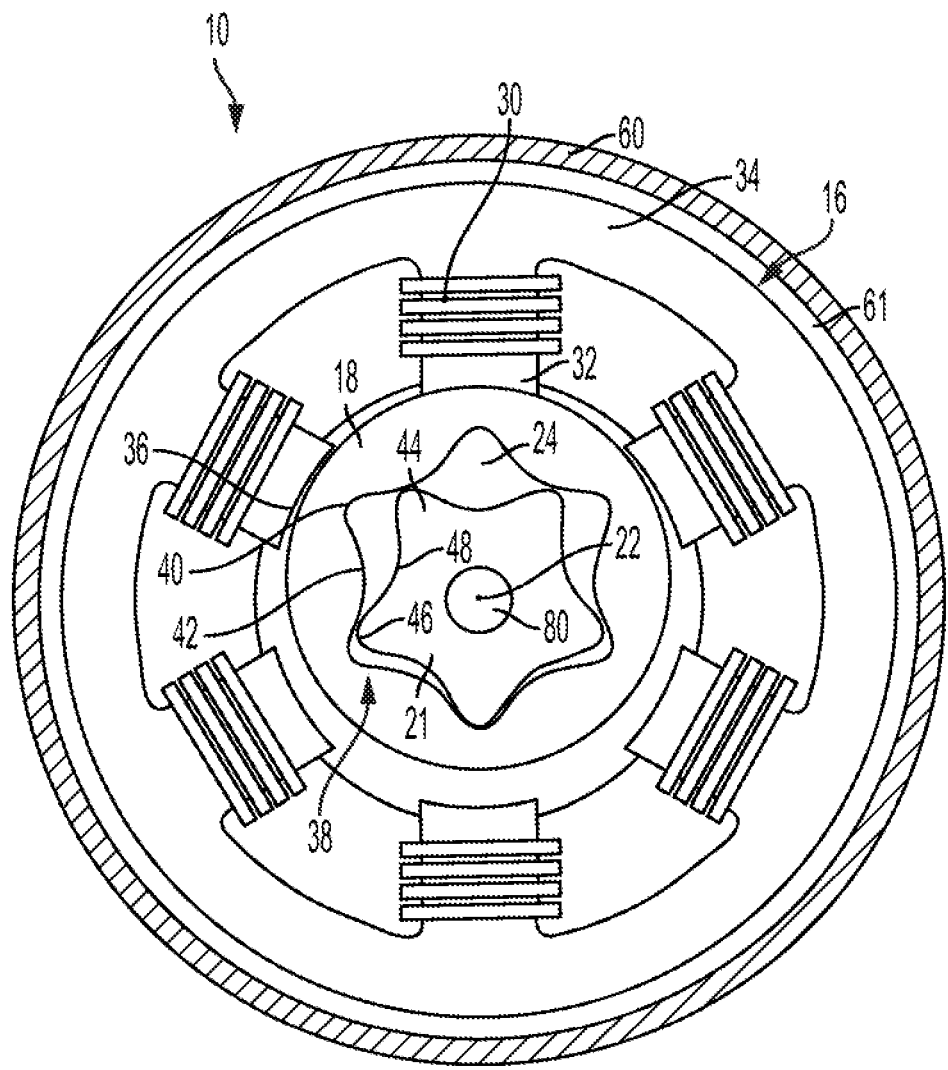
FIG. 2 illustrates a front-view of the pump 10 shown in FIG. 1.
Figure 3:
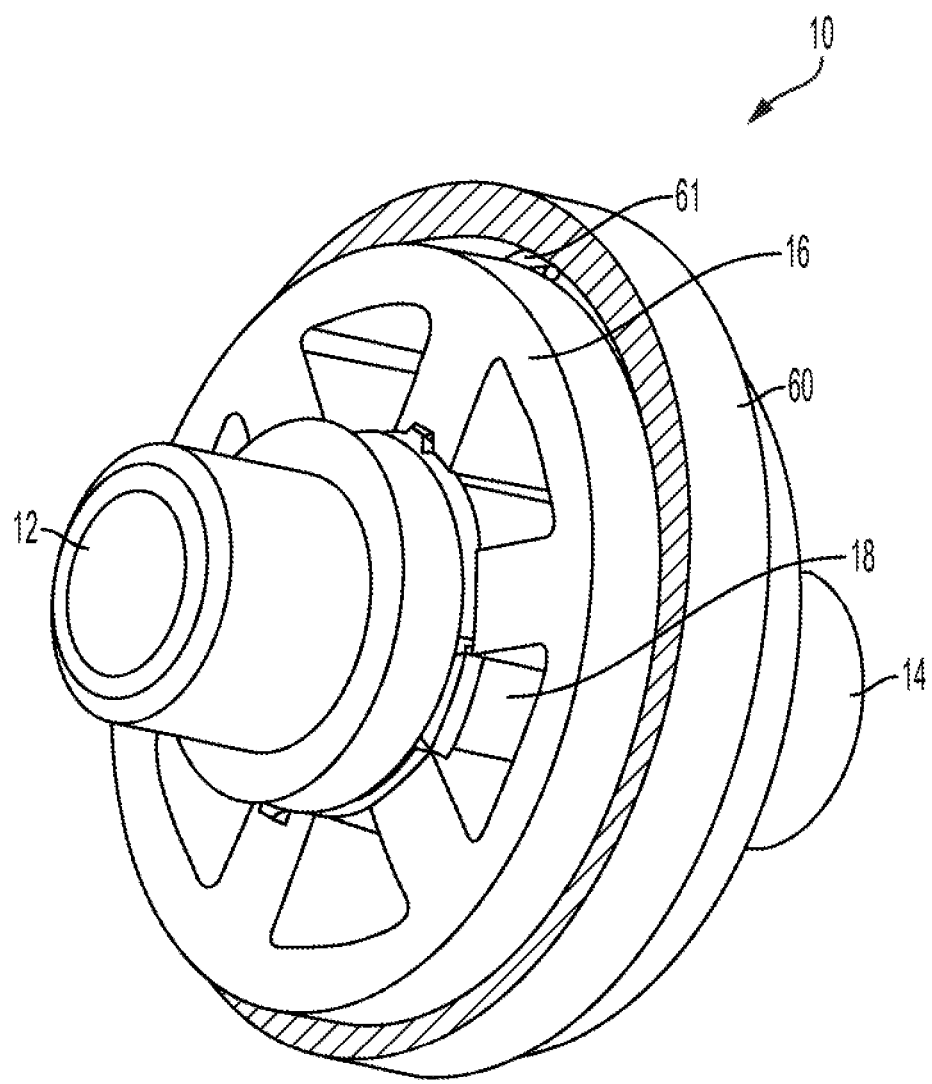
FIG. 3 illustrates a perspective view of the pump 10 shown in FIGS. 1 and 2.

FIG. 2 illustrates a front-view of the pump 10 shown in FIG. 1. FIG. 3 illustrates a perspective view of the pump shown in FIGS. 1 and 2. As shown in FIG. 3, there may be a gap 61 that is located between the ring 60 and the stator 16. As shown in FIG. 2, a stator 16 is provided with a plurality of electrical windings 30 for generating electromagnetic forces in stator 16 to urge rotor 18 toward stator 16 such that rotor 18 rotates, i.e., wobbles, inside of stator 16 about axis 22. The stator 16 may be provided with six electrical windings 30, but in other embodiments, stator 16 may be provided with any other amounts of windings 30 (e.g. greater than three). Windings 30 may be each wrapped around one of legs 32 of stator 16. Stator 16 includes a cylindrical ring 34 defining an outer circumference of stator 16, with each leg 32 protruding radially inward from cylindrical ring 34. A radially innermost surface 36 may have a concave shape; however, in other embodiments the surface 36 can be flat or have a different shape.

Rotor 18 and center section 21 may define a fluid flow chamber 24 radially therebetween. Pump 10 may also include an inlet control section configured for regulating fluid flow from fluid inlet section 12 into fluid flow chamber 24 and an outlet control section configured for regulating fluid flow from fluid flow chamber 24 into fluid outlet section 14. Inlet control section and outlet control section may be non-rotatably fixed in place with respect to center axis 22 and thus are rotationally fixed so as not to rotate as rotor 18 rotates.

Rotor 18 and center section 21 may define a fluid flow chamber 24 radially therebetween. Rotor 18 is configured such that during rotation thereof, grooves 38 of rotor 18 sequentially are forced onto protrusions 44 of center section 21 to continuously vary the configuration of fluid flow chamber 24. When an electric current is sent through any one of windings 30 a magnetic field is created which pulls rotor 18 toward that winding 30 in order to complete a magnetic circuit formed by the legs 32 of the stator. As rotor 18 moves toward the winding 30, rotor 18 displaces fluid, with which fluid flow chamber 24 between the rotor and stator is filled, creating pressure. The movement of rotor 18 within stator 16 about center section 21 separates fluid flow chamber 24 into a first portion, i.e., a pressure portion, that is pressurized to force fluid out of outlet section 14 and a second portion, i.e., a suction portion, that forms a vacuum to draw fluid into fluid flow chamber 24 from inlet section 12. The first portion of fluid flow chamber 24 accordingly has a lower pressure than the second portion of fluid flow chamber 24. As rotor 18 rotates within stator 16 about center section 21, the locations of the pressure portion and the suction portion of fluid flow chamber 24 rotate about center axis 22, with the pressure portion of fluid flow chamber 24 being oriented on the opposite radial side of center section 21 as the suction portion of fluid flow chamber 24 during the rotation. When the rotor 18 pulls around the inner gerotor 20, the pump may push fluid as gaps increase and/or decrease and pull fluid into the inlet section 12 and pumps it out the outlet section 14.

Center section 21 may have a star shaped cross-section when viewed axially and includes a plurality of circumferentially spaced radially outwardly extending protrusions 44 protruding away from center axis 22. Protrusions 44 each include a radially outermost rounded tip 46. Adjacent protrusions 44 may be spaced apart from each other by concave surfaces 48, which define portions of center section 21 that are radially thicker than portions of center section 21 at protrusions 44.

The rotor 18 may include six grooves 38 and center section 21 may include five protrusions 44, but in other embodiments rotor 18 may include other amounts of grooves 38 and center section may include other amounts of protrusions 44, with the amount of protrusions 44 being one less than the number of grooves 38, which may allow movement for the protrusions within the grooves 38.

As shown, a fastener 80 may be utilized to keep the various parts of the motor fastened together. The fastener 80 may be any type of a fastener, including a screw, rod, pin, etc. The stator 16, rotor 18, center section 21, inlet control section and outlet control section may be held axially together by a single fastener 80. Fastener 80 may be centered on center axis 22 and includes a shaft passing through the motor. Fastener 80 also axially forces various parts into the stator 16 against radially inner ends of legs 32. Fluid flow chamber 24 may be delimited axially between the inlet and outlet control sections and radially between the inner diameter surface of rotor 18 and the outer diameter surface of center section 21.

Rotor 18 may be substantially cylindrical shape with a cylindrical outer diameter surface and an inner diameter surface that defines a borehole may have a star shaped cross-section when view axially, however, any shape may be sufficient in alternative embodiments. The inner diameter surface of rotor 18 may include a plurality of circumferentially spaced radially outwardly extending grooves 38 extending away from center axis 22. Grooves 38 may each have a concave shape and may include a radially outermost point 40. Adjacent grooves 38 may be spaced apart from each other by convex surfaces 42, which define portions of rotor 18 that may be radially thicker than portions of rotor 18 at grooves 38.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST 10 pump
11 magnetic flux
12 fluid inlet section
14 fluid outlet section
16 stator
18 rotor
20 inner gerotor
21 center section
22 center axis
24 fluid flow chamber
26 inlet control section
30 electrical windings
32 stator legs
34 cylindrical ring
36 radially innermost surface
38 grooves
40 radially outermost point
42 convex surface
44 radially outwardly extending protrusions
46 radially outermost rounded tip
48 concave surfaces
60 ring
61 gap
62 stator groove
80 fastener The above is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

What is claimed is:

1. A pump, comprising:
   a rotor axially between a fluid inlet section of the pump and a fluid outlet section of the pump, wherein the rotor is configured to rotate about a center axis;
   the rotor comprising a rotor mass;
   a stator surrounding the rotor;
   a ring comprising a ring mass and surrounding the stator;
   wherein the ring mass is substantially equal to the rotor mass; and
   wherein the ring is configured to rotate about the stator in response to a magnetic flux introduced into the stator.

2. The pump of claim 1, where in the pump further includes an air gap located between an inner diameter of the ring and an outer diameter of the stator.

3. The pump of claim 2, wherein a diameter of the air gap decreases when the magnetic flux is introduced into the stator.

4. The pump of claim 2, wherein the stator further includes a groove located on an outer diameter of the stator, wherein a first surface of the groove faces an inner diameter of the ring.

5. The pump of claim 1, wherein the ring is concentric about the center axis.

6. The pump of claim 1, wherein the ring has a first polarity and the stator has a second polarity, and the first and second polarity are opposite polarities.

7. The pump of claim 1, wherein the stator includes a plurality of legs, wherein one or more of the plurality of legs includes coil windings configured to introduce the magnetic flux in response to electrification of the coil windings.

8. A pump, comprising:
   a rotor axially between a fluid inlet section of the pump and a fluid outlet section of the pump, wherein the rotor is configured to rotate about a center axis;
   the rotor comprising a rotor mass;
   a stator surrounding the rotor, wherein the stator includes an inner diameter surface and an outer diameter surface, the inner diameter surface comprising a groove encompassing the stator and concentric about the center axis;
   a ring comprising a ring mass and surrounding the stator, wherein the ring is located adjacent to the groove and defines a gap between an outer diameter of the surface and an inner surface of the ring, wherein the ring has a ring polarity opposite of a stator polarity; and
   wherein the ring mass is substantially equal to the rotor mass.

9. The pump of claim 8, wherein the ring is configured to rotate and decrease a diameter of the gap in response to a magnetic flux being introduced into the stator.

10. The pump of claim 8, wherein the ring includes a ring mass and the stator includes a stator mass, and the ring mass is 50% or less than the stator mass.

11. The pump of claim 8, wherein the ring includes a ring mass and the stator includes a stator mass, and the ring mass is substantially equal to the stator mass.

12. The pump of claim 8, wherein the ring is made of a first material and the rotor is made from the first material.

13. The pump of claim 8, wherein the ring is made of a first material and the rotor is made from a second material different from the first material.

14. The pump of claim 8, wherein the ring and the rotor are the only parts that rotate about the center axis in response to a magnetic flux being introduced to the stator.

15. The pump of claim 8, wherein the ring has a first offset and the rotor has a second offset from a center point, wherein the first offset and second offset are equal in distance from the center point.

16. A pump, comprising:
   a rotor axially located between a fluid inlet section of the pump and a fluid outlet section of the pump, wherein the rotor comprises a rotor mass, the rotor configured to rotate about a center axis;
   a stator surrounding the rotor, wherein the stator includes an outer diameter surface that includes a groove encompassing the stator and concentric about the center axis; and
   a ring comprising a ring mass and surrounding the stator, wherein the ring is adjacent to the groove and defines a gap between the outer diameter surface and an inner diameter surface of the ring,
   wherein the ring mass is substantially equal to the rotor mass.

17. The pump of claim 16, wherein the stator is configured to decrease a diameter of the gap in response to a magnetic flux being introduced into the stator.

18. The pump of claim 16, wherein the ring surrounds the outer diameter surface.

19. The pump of claim 8, wherein a first width of the groove is substantially equal to or larger than a second width of the ring.

20. The pump of claim 16, wherein the ring and the rotor are made of a same material.

* * * * *